United States Patent
Silva et al.

(10) Patent No.: US 6,463,056 B1
(45) Date of Patent: Oct. 8, 2002

(54) ARRANGEMENT FOR PROVIDING NETWORK PROTOCOL DATA INDEPENDENCE IN AN EXPANDABLE TELECOMMUNICATIONS SYSTEM

(75) Inventors: Michael C. Silva, Centerville; Mark P. Hebert, Kingston; Rajesh K. Mishra; Vinayak V. Antarkar, both of West Yarmouth, all of MA (US)

(73) Assignee: Excel Switching Corp., Hyannis, MA (US)

( * ) Notice: Subject to any disclaimer, the term of this patent is extended or adjusted under 35 U.S.C. 154(b) by 0 days.

(21) Appl. No.: 09/272,659

(22) Filed: Mar. 18, 1999

(51) Int. Cl.$^7$ ............................ H04J 3/16; H04M 11/00
(52) U.S. Cl. ................... 370/356; 370/410; 370/469; 379/93.01; 379/93.07; 379/93.31; 709/228
(58) Field of Search .................. 370/352, 356, 370/357, 400, 401, 410, 463, 469, 525; 379/93.01, 93.07, 93.09, 93.21, 93.31, 242, 909; 709/228

(56) References Cited

U.S. PATENT DOCUMENTS

| | | | |
|---|---|---|---|
| 5,544,163 A | | 8/1996 | Madonna .................. 370/60.1 |
| 5,546,453 A | * | 8/1996 | Hebert et al. ............... 379/242 |
| 6,084,892 A | * | 7/2000 | Benash et al. .............. 370/352 |
| 6,088,749 A | * | 7/2000 | Hebert et al. ............... 370/469 |
| 6,111,893 A | * | 8/2000 | Volftsun et al. ............ 370/466 |
| 6,333,931 B1 | * | 12/2001 | LaPier et al. ............... 370/352 |

FOREIGN PATENT DOCUMENTS

GB    2 207 835    2/1989
WO    97 24885    7/1997

OTHER PUBLICATIONS

Bellcore, Generic Requirements, "Call Processing," GR–505–CORE, Issue 1, Dec. 1997.

* cited by examiner

*Primary Examiner*—Alpus H. Hsu
*Assistant Examiner*—Afsar M. Qureshi
(74) *Attorney, Agent, or Firm*—Cesari and McKenna, LLP (57) ABSTRACT

A network protocol data intelligence (NPDI) software in the switching node that enables the call processing components in the L4 and L5 applications to interpret and manipulate different network signaling data protocols. The call processing applications are expanded to understand different network signaling protocols and to extract the required information from each protocol's data stream. The NPDI provides the means for the L4 application to convert from one network signaling data format to another either, by itself or in conjunction with the L5 application. Thus, the system operator may configure the switch to perform all call processing functions or by-pass the NPDI and have the L5 application perform these functions. The L4 application may also perform data translation from host applications written against the underlying network protocol to the different signaling protocols from other networks. Thus, a host application written against one network signaling protocol may communicate with an application using another signaling protocol without modification to the host application. The NPDI service further enables the L4 application to convert protocol-specific data from other applications in the system to protocol independent data that can be 'understood' by the L3 and L5 applications. In addition, the L4 application may route calls in the switching node based on network signaling information from the L3 application.

18 Claims, 7 Drawing Sheets

UNIVERSAL PROTOCOL FORMAT DATA STRUCTURE 400

| TAG | LENGTH | VALUE |
|---|---|---|

| 502 — TAG | 0 x 17 |
|---|---|
| 504 — LENGTH | NUMBER OF BYTES BELOW (STARTING WITH DATA[0]) |
| 506 — DATA[0] | TYPE OF NUMBER (FIG. 5B) |
| 508 — DATA[1] | NUMBERING PLAN IDENTIFIER (FIG. 5C) |
| 510 — DATA[2] | NUMBER OF DIGITS |
| 512 — DATA[3] | DIGITS |
| 514 — DATA[4] | DIGITS |
| ... | ... |

FIG. 5B

| INN INDICATOR | REVERSE CHARGE INDICATOR | INTERNATIONAL NUMBER | NATIONAL NUMBER | NETWORK SPECIFIC NUMBER | SUBSCRIBER NUMBER | ABBREVIATED NUMBER |
|---|---|---|---|---|---|---|

| ISDN | DATA | TELEX | NATIONAL STANDARD | PRIVATE |
|---|---|---|---|---|

ARRANGEMENT FOR PROVIDING NETWORK PROTOCOL DATA INDEPENDENCE IN AN EXPANDABLE TELECOMMUNICATIONS SYSTEM

TECHNICAL FIELD

This invention relates generally to the field of telecommunications switching systems and more particularly to a software application in a switching node that enables the switching node to interpret and manipulate network signaling information from the underlying computer network to which the switching node is attached.

BACKGROUND OF THE INVENTION

An example of a switching system to which the present invention applies is described in U.S. Pat. No. 5,544,163, Expandable Telecommunications System, the contents of which are incorporated by reference herein. A telecommunication switching node described therein has line cards with multiple ports connected to subscriber's telephone lines or to other devices such as PSTN trunks. The switching node also includes a switch/matrix card and at least two system buses for switching calls received on one port to another port in the system. One of these buses is an incoming bus that passes messages from the line cards to the matrix card and the other is an outgoing bus which transmits messages from the matrix card to the line cards.

The telecommunications system also includes a host, i.e., a group of software applications that typically reside on a computer dedicated to those applications. The switching nodes on the system are interconnected by an internodal switching network. A second network termed the "host network," interconnects the switching nodes and the host computer for supervisory control. The host, the switching nodes and the line cards each includes a software protocol application that processes calls at its level of the system. Specifically, a Layer 5 (L5) protocol application in the host manages calls at the host level; a Layer 4 protocol application (L4) in the switch manages calls at the switch level; and Layer 3 (L3) protocol applications in the line cards handle calls at the line card level of the system.

Traditionally, the L5 application in the host has managed the L4 functions in the switch. Thus, when a switch received an incoming request for service from a line card, the request was transmitted from the L4 application to the L5 application. In response to the request, the L5 application instructed the L4 application on which switching functions to perform. Since the L5 application was involved in directing nearly all real-time call processing on the switch, the message traffic between the switch and the host was high and this sometimes delayed the transmission of messages between the host and the switch. Moreover, if the host-to-switch link failed or if the host failed, the switch was basically rendered inoperable.

More recently, the L4 application in the switch was expanded to provide functions previously performed exclusively in the L5 application. Moreover, the L4 application was made user-programmable so that a system owner/operator might expand pre-defined L4 call management operations to accommodate unique call processing requirements. To expand the L4 functions, the L4 application is separated into primary and secondary software objects or state machines that are separately dedicated to specific tasks for each "channel" in the switching node. The term "channel" encompasses the data paths between each port and the switch/matrix, and also the software objects in the switch/matrix that directly supervise the use of these paths. Each channel is associated with an instance of the primary L4 software objects.

Among the primary L4 software objects are a channel state machine (CH) and a call management state machine (CM). The CH manages state information for its associated channel. This includes information about the states of the other objects in the channel. The CM manages information about the state of any call in its associated channel. An interworking state machine is one of the secondary software objects in the L4 application. The interworking state machine gives the user the capability to specify the call model on a channel-by-channel basis.

The system described above is usually connected to other telecommunications systems in a broader telecommunications network. The L3 application receives the underlying network signaling messages in units such as, packets or frames, and it transmits these units to the L4 application. The signaling messages constitute the distinct control infrastructure that enables provisions of all other services on the network. They enable software applications in the telecommunications network to exchange messages related to call setup and call tear-down and they also enable the exchange of information needed for distributed application processing and network information management. These messages are structured according to specific protocols used by the respective systems on the network. Specifically, there are different types of network signaling protocols, each with its own data formats and standards.

Currently the switch 'ignores' most network signaling messages received from the L3 applications and forwards them to the L5 application for processing. The L5 application separates the units, extracts the necessary data and instructs the L4 application on how to process this data. For requests to other systems, the L5 application packages the units and forwards them to the L4 application for transmission to the L3 applications. Thus, the L4 application does not process messages in various network signaling protocols without the host intervention. This requires the L5 application involvement in managing all network signaling messages on the switch and the switch is therefore still unable to process information in these messages when there is a host failure. Moreover, each time a protocol is added to the network or modified, the L5 application must also be modified to interpret it.

SUMMARY OF THE INVENTION

We have provided novel network protocol data intelligence (NPDI) software in each L4 application that enables the call processing components in either the L4 or L5 application to interpret and manipulate data arranged in different network signaling protocols. The NPDI service manipulates different network signaling protocols and extracts the required messages. It translates these messages into an 'universal' internal protocol that is 'understood' by L5 applications and it forwards the messages to an L5 application for further processing. If an incoming signaling message is to be routed through the switch to another external system, the NPDI service also translates the message from the 'universal' protocol into an equivalent message in the protocol of the other system and forwards the message to the corresponding L3 application for further transmission to that system. Thus, the NPDI provides the means for the L4 application to convert from one network signaling protocol format to another.

If a new protocol is added to a network, the NPDI translates messages exchanged between host applications and systems using the new protocol. Therefore, host applications may communicate with systems using different protocols without modification to either the host application or the external systems. Thus the NPDI enables the L4 application to route calls in the switch based on network signaling information transmitted through the L3 application.

With the foregoing arrangement, the capability of the switch is expanded. The system operator may either configure the switching node to perform call processing functions or have the L5 application perform these functions. Moreover, we have provided the NPDI with a structure that facilitates addition or modification of network protocols.

More specifically, the NPDI service includes an NPDI function library and one or more protocol awareness applications such as an interworking component. The function library is a collection of functions that provide protocol-independent messages in a 'universal'/generic data structure to the L4 and L5 call processing components. The protocol awareness applications use the function library to translate network signaling messages to universal data structures that can be used with the host L5 application or L4 switching node application. The interworking component a protocol awareness application that communicates with other objects in the L4 application and it uses the NPDI library functions in order to perform protocol translations. The library thus enables the L4 and L5 call processing components to manipulate protocol-specific data from the network or other sources.

BRIEF DESCRIPTION OF THE DRAWINGS

The invention description below refers to the accompanying drawings, of which.

DETAILED DESCRIPTION OF AN ILLUSTRATIVE EMBODIMENT

Figure 1:
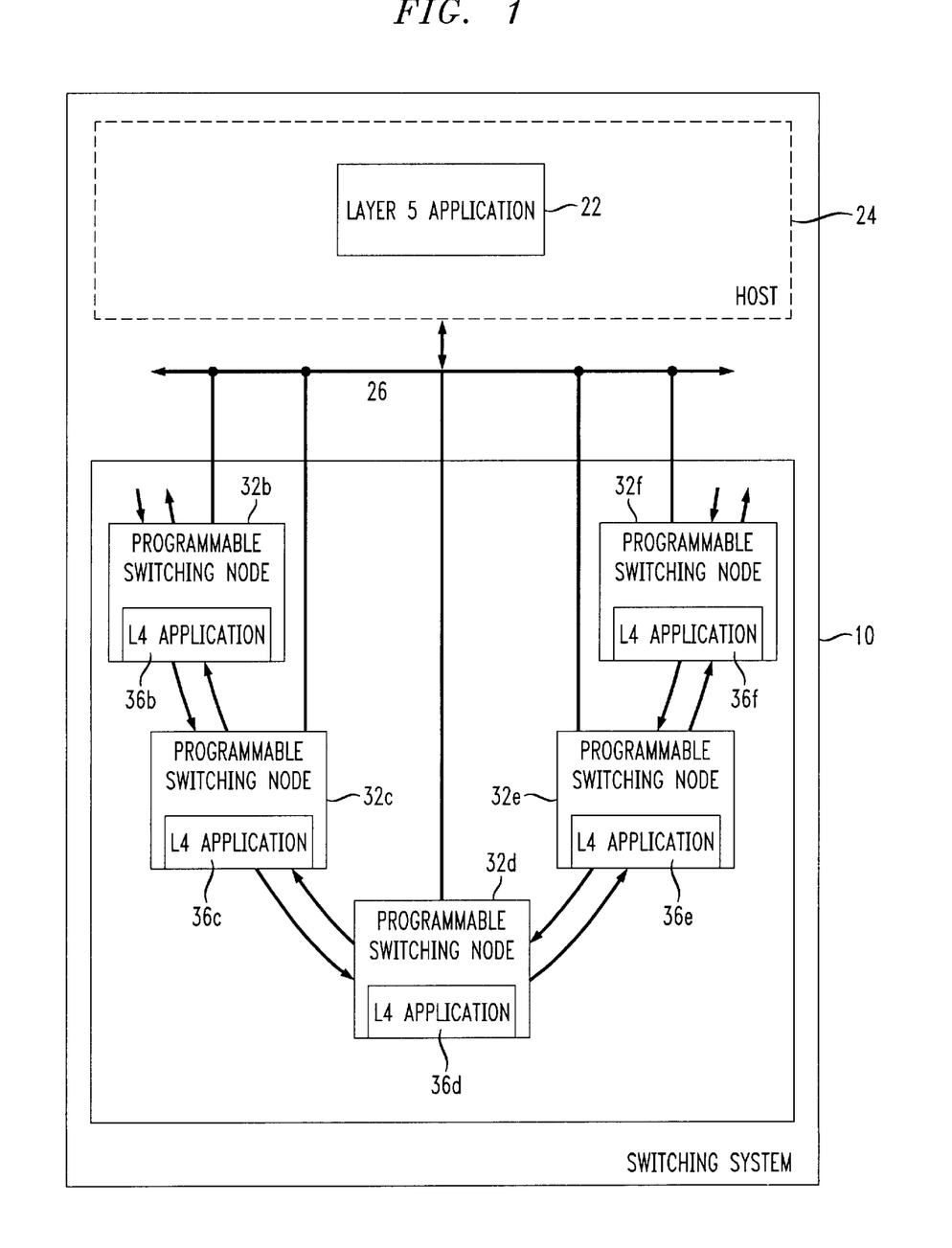
FIG. 1 is a diagram of a call switching system incorporating the invention.

The system in FIG. 1 is configured to process calls to, from and within a switching system 10. The switching system 10 includes switching nodes 32b–32f that are connected by a ring-like internodal switching network 34 to pass among them the various messages (calls) handled by the switching system 10. Each switching node is associated with a plurality of network/line interfaces (not shown) which provide connections between the switching system 10 and subscribers' lines, for example, and also with other switching systems such as the PSTN. These interfaces also provide access to system resources such as DSP resources and voice-mail functions. The switching system 10 also includes a host computer 24 that runs a host supervisory application 22. The supervisory application 22 generally provides overall supervision, i.e., control and monitoring, of the switching functions of the network. The host computer 24 is linked to the switching nodes 32b–32f by a host network 26.

The host computer 24, the switching nodes 32b–32f and the line cards (not shown) each includes a software application which processes calls in its respective layer of the system. A Layer 5 (L5) application 22 in the host 24 manages calls at the host level; Layer 4 (L4) 36b–36f applications in the switching nodes 32b–32f manage calls at the switch level; and Layer 3 (L3) applications in the line cards manage calls at the line card level. In the present invention, the L4 applications 36b–36f have been expanded to enable the L4 and L5 applications 36 and 22 to 'understand' and manipulate network signaling messages in protocols transmitted between the L3 applications and external switching systems.

Figure 2:
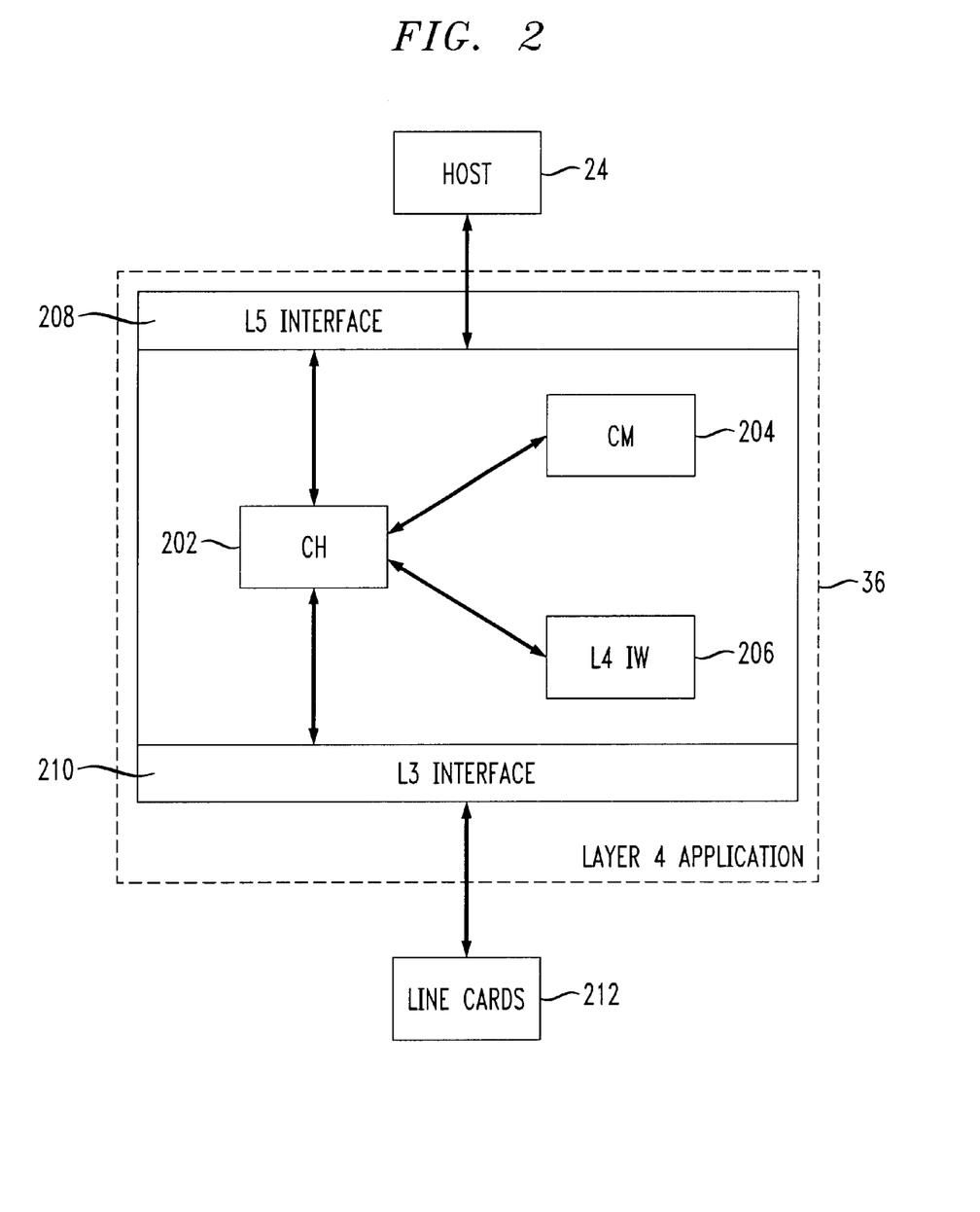
FIG. 2 is a schematic diagram of the L4 protocol application and how the objects interact with each other and with the L5 protocol and the L3 protocol application.

The illustrative L4 protocol application 36 shown in FIG. 2 comprises a channel state machine (CH) 202, a call management state machine (CM) 204, an interworking state machine 206, a layer 5 interface 208 and a layer 3 interface 210 among others. An instance of the CH 202 and CM 204 is associated with each channel in the switching nodes 32b–32f. Each instance of the CH 202 manages its channel state information. The CH 202 primary functions include managing the L3 or line card channel interface 210 for call control; managing the L5 or host call processing interface 208 for those call processing functions that reside in the host, and processing request and events to and from the CM 204. The:CM 204 manages the propagation of channel events to and from other channels in the switching nodes 32b–32f. It filters incoming events from other channels to ensure that those events are proper for the current call and channel states. The interworking state machine 206 enables the switching nodes 32b–32f and host 24 to translate and manipulate network signaling protocols from the line cards 212/L3 applications.

Figure 3:
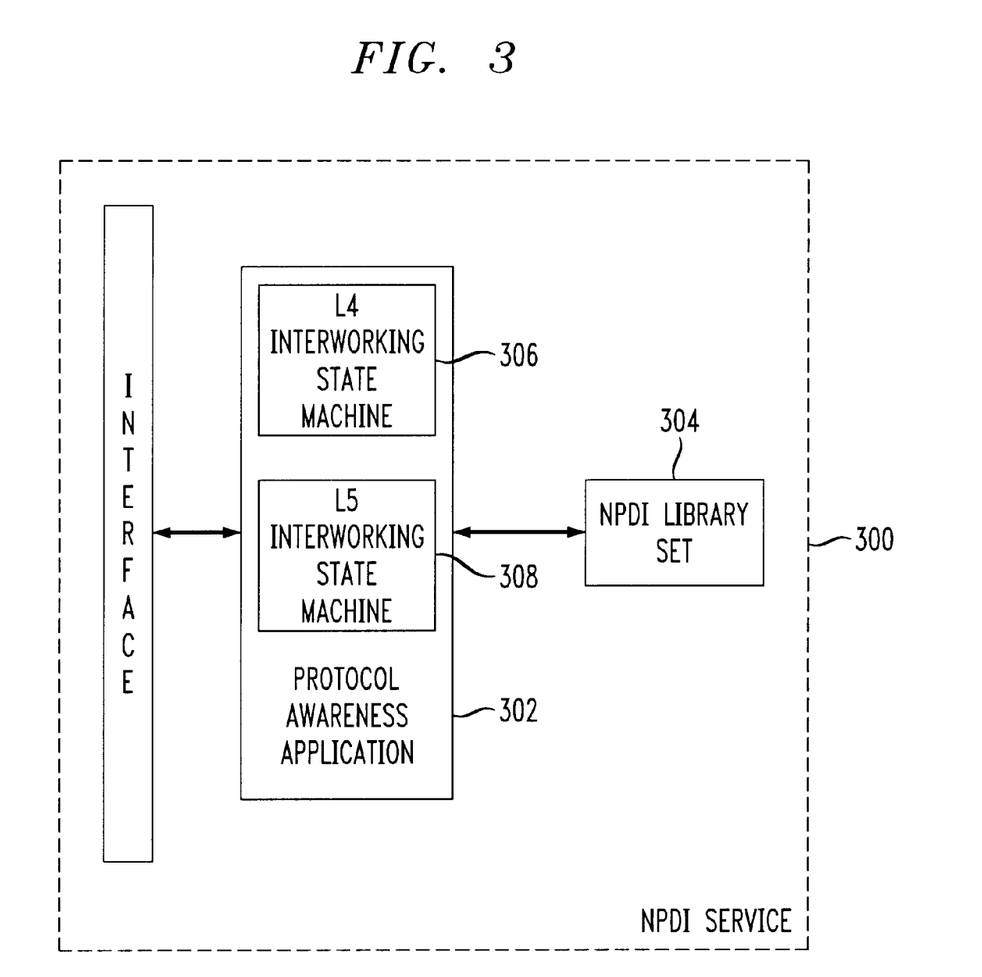
FIG. 3 is a diagram of the NPDI services.

The interworking state machine 206 uses a NPDI service 300, detailed in FIG. 3, to convert messages between various network protocols. The NPDI service 300 comprises protocol awareness applications 302 and a function library 304. The protocol awareness applications 302 use the function library 304 to translate network signaling messages to universal data structures that can be used with the L5 application 22 or L4 application 36. The function library 304 is a set of software functions used by applications inside and outside the switching node 32b–32f in processing calls. The function library 302 enables conversions between a general-purpose data structure known as the 'universal protocol format', that all applications can 'understand', and formats of other systems that communicate with the depicted switching system. The L3 applications transmit to the L4 application 36 messages in the universal protocol data format or in different data formats received from connected switching systems. Therefore, the universal protocol format data structure represents a common standard for all data processed by the L4 application 36 and it makes it easier to add or modify protocols on the network.

The protocol awareness applications 302 further comprise a L4 interworking state machine (L4 IW) 306 and a L5 interworking state machine L5 IW 308. The L4 IW 306 accesses the functions in the function library 304 to convert messages from one protocol to messages of equivalent meaning in another protocol. The L4 IW 306 communicates with instances of the CH 202 in the L4 application. Thus, messages entering and leaving the switching node are checked by the CH 202 to ensure that they are in the appropriate format. If they are not, the CH 202 forwards the messages to the L4 IW 306 for conversion to the appropriate format.

The L5 IW 308 performs for L5 applications 22 the same service that the L4 IW 306 performs for the L4 application 36. The L5 IW 308 may use the function library 304 to convert protocol-specific messages from the L4 application 36 into messages in the universal protocol format. The L5 IW 308 may also convert messages from one protocol to messages of equivalent meaning in another protocol. For example, a L5 application 22 that 'understands' message in an ISDN network protocol may accept messages in a more recently added SS7 network protocol by having the L5 IW 308 translate the messages between the two protocols. Thus, the L5 application 22 may communicate with other systems without having to know the underlying network signaling protocol used by each system and without further modification to the L5 application 22.

Figure 4:
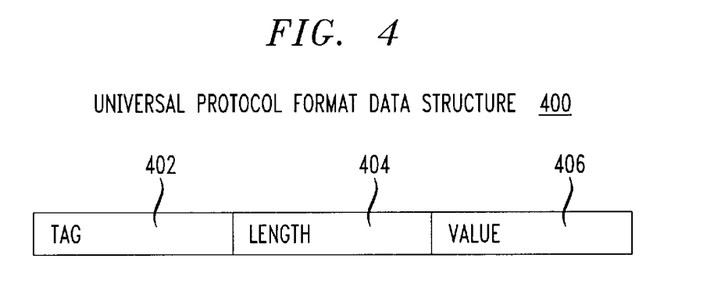
FIG. 4 depicts the universal protocol format data structure used by the switching system.

FIG. 4 depicts the universal protocol format data structure 400 used by the switching system. The data structure contains one or more sets of logical data and each set has three fields. The first field contains a tag 402 which identifies the data. The second field 404 indicates the length of the data and the third field 406 contains the data itself.

Figure 5A:
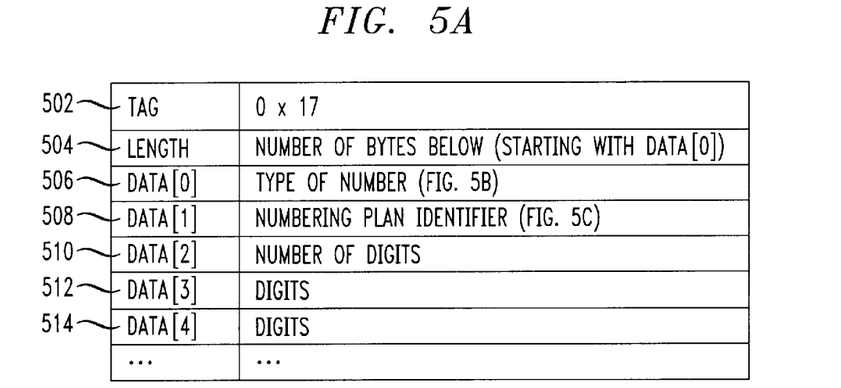
FIG. 5A is an example of the universal protocol format data structure that represents a called party number.
Figure 5B:
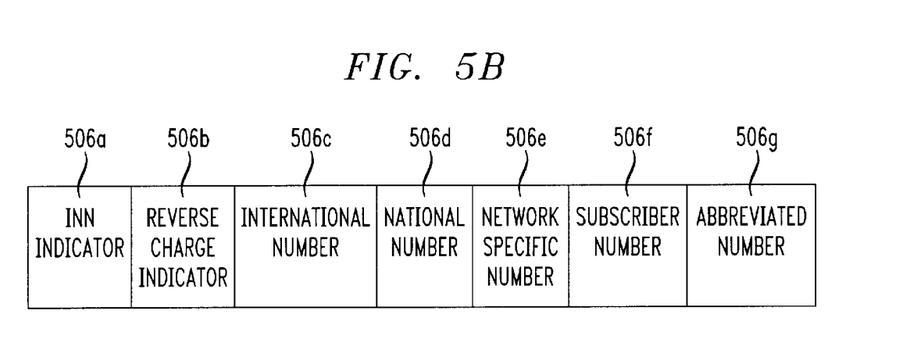
FIG. 5B describes of the data contents in the type of number field.
Figure 5C:
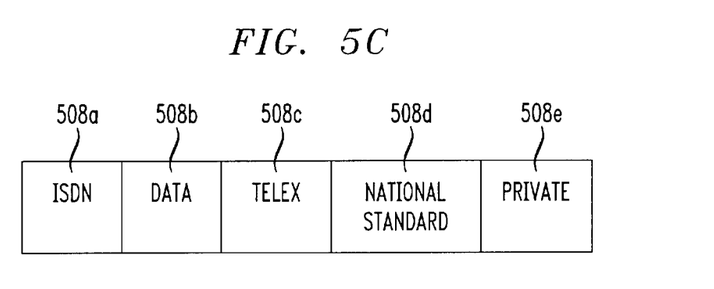
FIG. 5C describes of the data contents in the numbering plan identifier field.

FIG. 5A is an example of the universal protocol format data structure that represents a called party number. The contents of the tag field 502 indicates that a called party number is stored in the data structure; the length field 504 contents indicates the length of the data; and the data contents 506–514 represent data associated with the called party number. FIG. 5B describes of the data contents of the type of number field 506. The first bit 506a of the type of number field 506 indicates whether international number routing is allowed; the second bit 506b indicates whether reverse charge is requested; and the fourth to eighth bits respectively indicate whether the number is an international number, a national number, a network specific number, a subscriber number and an abbreviated number. FIG. 5C describes the data contents in the numbering plan identifier field 508. The bits in the numbering plan identifier field 508a–508e respectively indicate whether the numbering plan is ISDN, Data, Telex, National Standard or Private plan.

Figure 6:
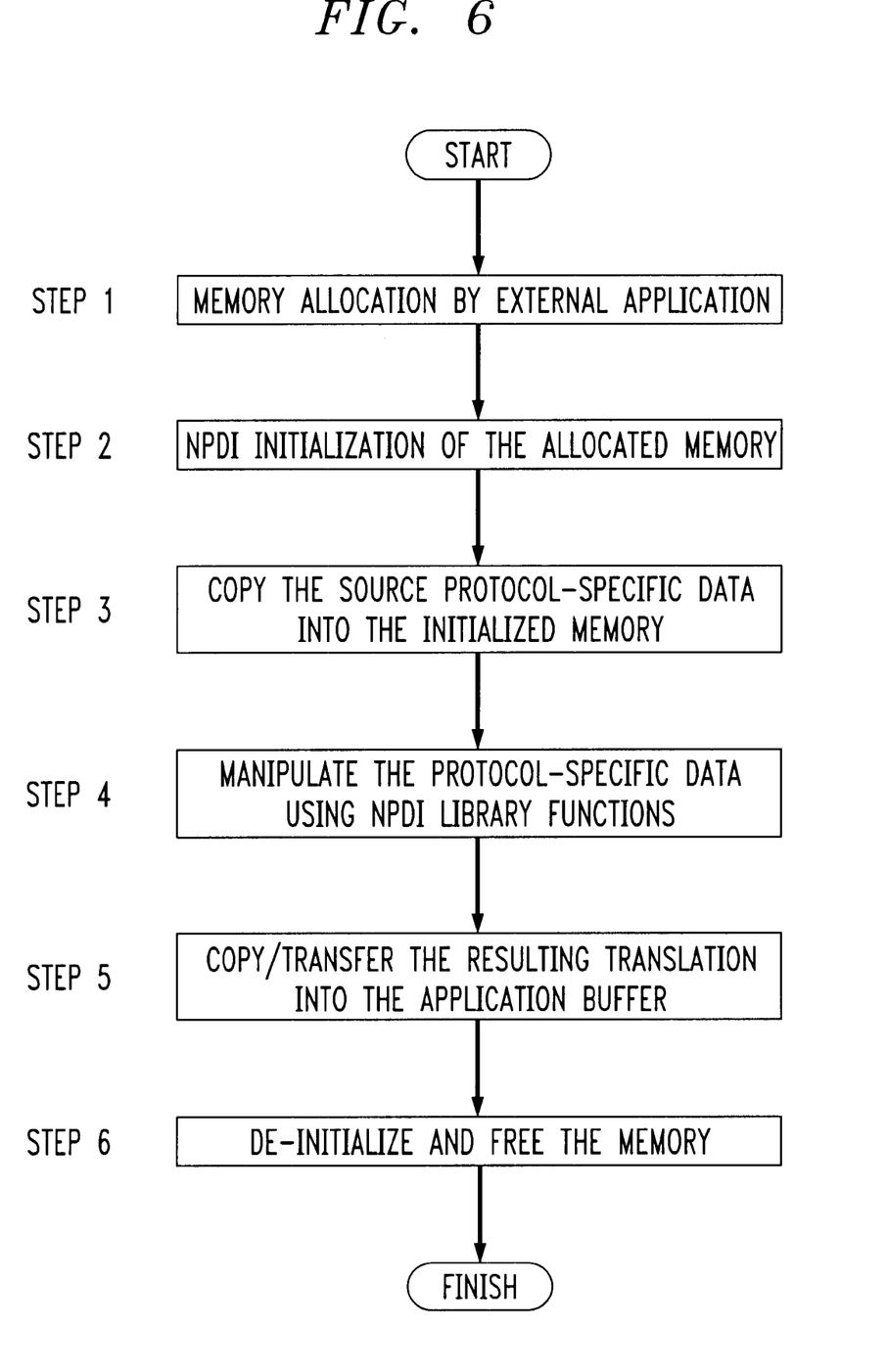
FIG. 6 describes the steps performed by an application using NPDI library functions during a 'normal' call flow.

FIG. 6 describes the steps performed by an application using NPDI service for incoming signaling message during a 'normal' call flow. The application may be either the an instance of the CH 202 in the L4 application 36 or it may be the host L5 application 22. In Step 1, the application allocates a first memory buffer where the incoming data is to be stored. In Step 2, the application invokes the IW component 304 or the protocol awareness application 306 which initializes the allocated memory. The application copies incoming protocol-specific data into the initialized buffer in Step 3. In Step 4, the application calls the IW component 304 or the protocol awareness application 306 to convert the protocol specific data into the universal protocol data format. The IW component 304 and the protocol awareness application 306 use functions in the NPDI library to perform the necessary conversions. In Step 5 the application copies the resulting translation in the universal protocol format into a second memory buffer. In Step 6 the IW component 304 or the protocol awareness application 306 de-initializes the first buffers and the application releases the de-initialized memory.

Figure 7:
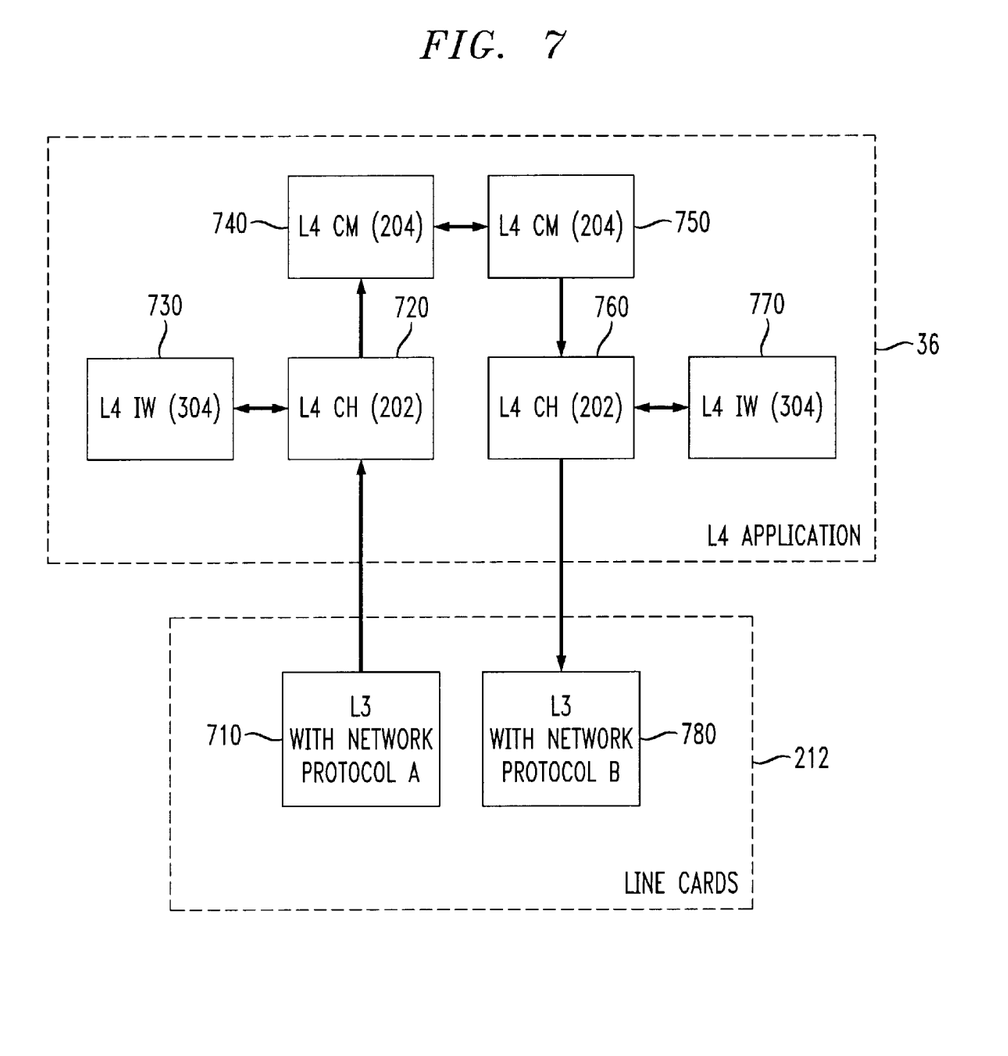
FIG. 7 is a data flow diagram of how the L4 application converts protocol specific data into the universal protocol format in order to transfer data across different protocols formats.

FIG. 7 is a data flow diagram of how the L4 application 36 converts protocol-specific data into the universal protocol format in order to exchange information across systems using different protocols. The L3 application transmits a network signaling message from a system using Protocol A 710 to the CH (202) 720 in a local channel. The local CH (202) 720 checks a format field in the incoming message to determine if the message is in the universal protocol data format. If it is, the local CH (202) 720 forwards the message to the local CM (204) 740. If it is not in the universal format, the local CH 720 (202) transmits the message to the IW (304) 730. The IW (304) 730 uses the appropriate NPDI library functions to convert the message to the universal format and the IW (304) 730 returns the message to the local CH (202) 720. The local CH (202) 720 then. forwards the universal formatted message to the local CM (204) 740. The local CM (204) 740 transmits the message to a remote CM (204) 750 in another channel through a router in the switching node 32 or the L5 application 22 in the host 24. The remote CM (204) 750 forwards the message to a remote CH (202) 760. If the network accessed by the remote L3 does not 'understand' the 'universal protocol format', the remote CH (202) 760 forwards the message to the IW (304) 770 for conversion from the universal protocol format to the remote network's protocol. The IW (304) 770 converts the message using the appropriate NPDI library functions and returns the message to the remote CH (202) 760. The remote CH (202) 760 then transmits the data to a L3 application for further transmission to a system using Network Protocol B 780.

Figure 8:
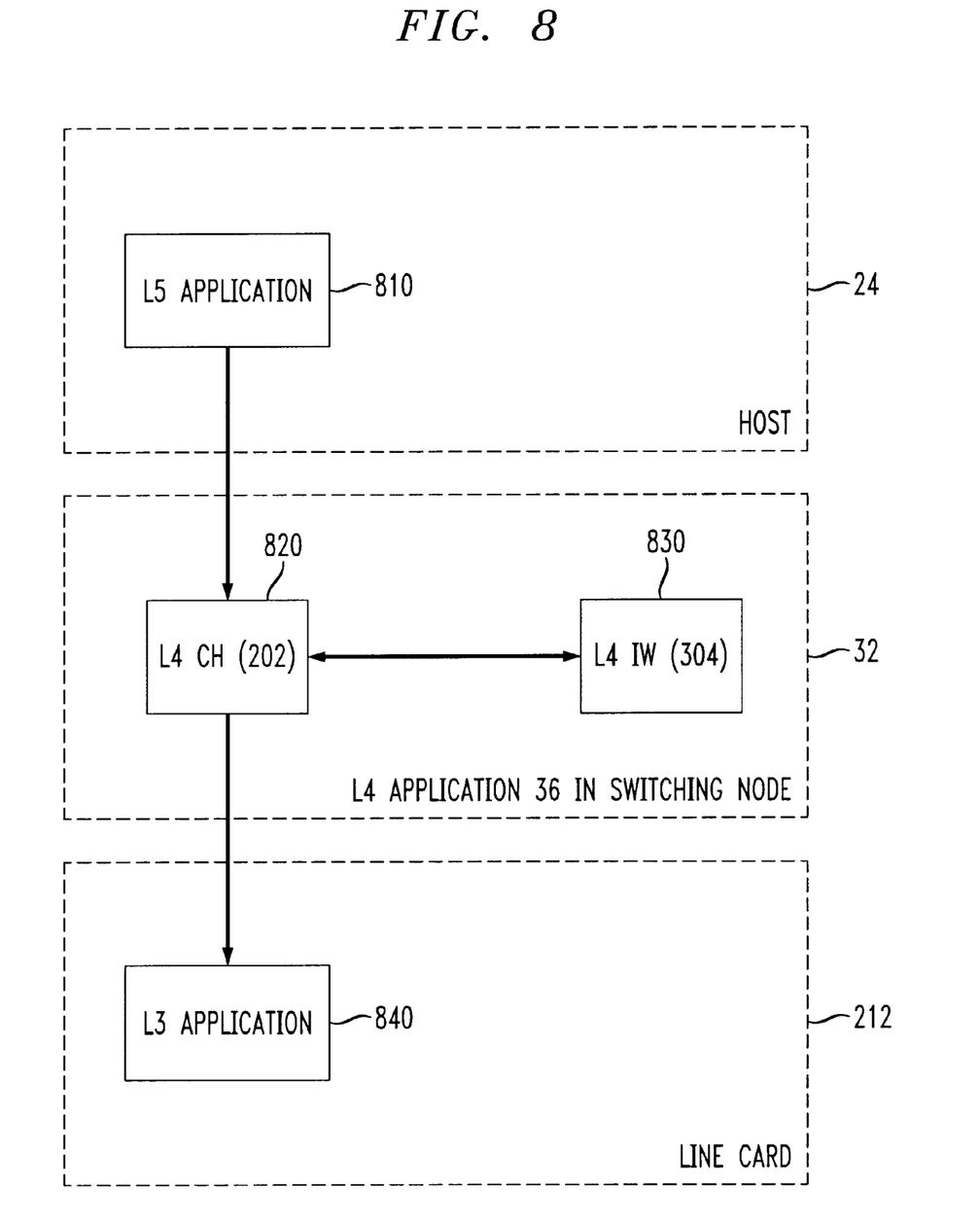
FIG. 8 is a data flow diagram of how the L4 application converts protocol specific data from the L5 host application into a network signaling protocol.

FIG. 8 is a data flow diagram of how the L4 application 36 converts messages from the L5 host application 22 in one protocol into equivalent messages in another protocol. The L5 application (22) 810 in the host transmits host-protocol-specific messages to the CH (202) 820 in a local channel. The local CH (202) 720 transfers the messages to the IW (304) 830. The IW (304) 830 uses the appropriate NPDI library functions to convert the messages into a network signaling protocol and the IW (304) 830 returns the messages to the local CH (202) 820. The local CH (202) 820 then transmits the messages to the L3 application 840 through the usual process.

The foregoing description has been directed to specific embodiments of this invention. It will be apparent, however, that other variations and modifications may be made to the described embodiments, with the attainment of some or all of their advantages. Therefore, it is the object of the appended claims to cover all such variations and modifications as come within the true spirit and scope of the invention.

What is claimed is:

1. A switching system comprising:
   A) a plurality of switching nodes each of which contains line cards with ports for connections between the system and one or more external networks;
   B) Layer 3 applications in the line cards that exchange data arranged in one or more external network protocols between the switching system and the external network;
   C) an internal network interconnecting the switching nodes for conveying switched telecommunications data between them;
   D) a host computer that includes a Layer 5 software application which exercises supervisory control over the nodes;

E) a host network linking the host computer and the switching nodes for supervisory and informational communications;

F) a programmable Layer 4 software application in each switching node that performs call-processing operations defined by a system operator, the Layer 4 application having a protocol software component that interprets between protocols of the switching system and the external network including means for checking messages to ensure that the messages are in a generic format, or are in a format of a receiving external system, or are in a format of the Layer 5 application, whereby the protocol software component interprets between protocols of the switching system and the external network; and G) means for communicating and passing information between:
   1. the protocol software component in the Layer 4 application and the Layer 5 application; and
   2. the protocol software component and other objects in the Layer 4 application.

2. The switching system of claim 1 wherein the protocol software component comprises means for:
   1. manipulating various network signaling protocols;
   2. extracting messages from the network signaling protocols;
   3. translating the messages in another protocol; and
   4. forwarding the translated messages to the Layer 5 applications or other objects in the Layer 4 application for further processing.

3. The switching system of claims 2 wherein the protocol software component further comprises a function library and at least one protocol-awareness application.

4. The switching system of claims 3 wherein the function library comprises a collection of functions including functions that translate messages in various network signaling protocols to a generic format in order for the Layer 4 and Layer 5 applications to utilize these messages.

5. The switching system of claim 4 wherein the protocol awareness application translates messages:
   A) between various network signaling protocols and a generic format that can be used with by Layer 5 application and by other objects in the Layer 4 application; and
   B) from one protocol to messages of equivalent meaning in another protocol.

6. The switching system of claim 5 wherein the protocol awareness application further comprises a Layer 4 protocol awareness application and a Layer 5 protocol awareness application.

7. The switching system of claim 6 wherein the protocol software component uses a generic data structure that comprises at least one set of logical data and the logical data set further comprising a tag field which identifies the type of data, a length field containing the length of the data and fields containing the data itself.

8. A switching node comprising:
   A) line cards with ports, each line card including a Layer 3 application for exchanging data between the node and one or more external networks or subscribers;
   B) a programmable Layer 4 software application that performs call-processing operations defined by a system operator, the Layer 4 application comprising:
      1. an interface to a Layer 5 application in a host computer, the Layer 5 application exercising supervisory control over the switching node, and
      2. a protocol software component that interprets between protocols of the switching node and the external network; and
   C) means for passing information between the protocol software component and the Layer 5 application and between the protocol software component and other objects in the Layer 4 application, via messages, and including means for checking messages to ensure that the messages are in a generic format, or are in a format of a receiving external network, or are in a format of the Layer 5 application, whereby the protocol software component interprets between protocols of the switching node and the external network.

9. The switching node of claim 8 wherein the protocol component comprises means for:
   1. manipulating various network signaling protocols;
   2. extracting messages from the network signaling protocols;
   3. translating the messages in another protocol; and
   4. forwarding the translated messages to the Layer 5 application or other objects in the Layer 4 application for further processing.

10. The switching node of claims 9 wherein the protocol component further comprises a function library and at least one protocol-awareness application.

11. The switching node of claims 10 wherein the function library comprises a collection of functions including functions that translate messages in various network signaling protocols to a generic format in order for the Layer 4 and Layer 5 applications to utilize these messages.

12. The switching node of claim 11 wherein the protocol awareness application translates messages
   A) between various network signaling protocols and a generic format that can be used with by Layer 5 application and by other objects in the Layer 4 application; and
   B) from one protocol to messages of equivalent meaning in another protocol.

13. The switching node of claim 12 wherein the inter-working component communicates with other objects in the Layer 4 application and uses the functions in the function library to execute requests from these objects.

14. The switching node of claim 13 wherein the protocol component uses a generic data structure that comprises at least one set of logical data and the logical data set further comprising a tag field which identifies the type of data, a length field containing the length of the data and fields containing the data itself.

15. A method for translating messages in a switching system from one network protocol of an external network or system into another network protocol of a receiving external network or system, the switching system including at least one line card with ports and a Layer 3 application for exchanging messages between the system and one or more external networks, a programmable Layer 4 software application having objects for performing call-processing operations defined by a system operator, the Layer 4 application also having an interface to a Layer 5 application in a host computer, an interface to the Layer 3 application and a protocol component that interprets between protocols of the switching node and the external network, said method comprising the steps of:
   A) receiving in the switching system various messages from external networks through the ports and the Layer 3 application in the line card;
   B) forwarding the messages from the Layer 3 application to the Layer 4 application;

C) extracting the messages from network protocols in the Layer 4 application or in the Layer 5 application;

D) translating the messages into equivalent messages in other network protocols;

E) sending the translated messages to the Layer 5 application for further processing or to the Layer 3 applications for further transmission to the external network; and F) checking flags in messages to ensure that the messages are in a generic format or in the formats of receiving external systems or in the format of the Layer 5 application.

16. The method as defined in claim 15 including the further step of:

sending the messages from objects in the Layer 4 application to the protocol component for translation.

17. The method as defined in claim 15, including the further step of:

using functions in the protocol component to translate the message to the generic format or to the format of receiving external systems or to the format of the Layer 5 application.

18. The method as defined in claim 15 including the further step of:

returning the messages to the objects in the Layer 4 application or to the Layer 5 application.

\* \* \* \* \*